United States Patent
Connolly et al.

(10) Patent No.: US 10,902,060 B2
(45) Date of Patent: *Jan. 26, 2021

(54) UNBOUNDED LIST PROCESSING

(71) Applicant: International Business Machines Corporation, Armonk, NY (US)

(72) Inventors: Robert J. Connolly, Boynton Beach, FL (US); Michael J. Hudson, Delray Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 107 days.

This patent is subject to a terminal disclaimer.

(21) Appl. No.: 16/384,308

(22) Filed: Apr. 15, 2019

(65) Prior Publication Data

US 2019/0266183 A1    Aug. 29, 2019

Related U.S. Application Data

(63) Continuation of application No. 15/191,903, filed on Jun. 24, 2016, now Pat. No. 10,296,655.

(51) Int. Cl.
*G06F 16/20*    (2019.01)
*G06F 16/84*    (2019.01)
*G06F 16/34*    (2019.01)

(52) U.S. Cl.
CPC .............. *G06F 16/84* (2019.01); *G06F 16/34* (2019.01)

(58) Field of Classification Search
CPC ................................ G06F 16/34; G06F 16/84
See application file for complete search history.

(56) References Cited

U.S. PATENT DOCUMENTS

| | | | |
|---|---|---|---|
| 6,295,533 B2 | 9/2001 | Cohen |
| 6,754,884 B1 | 6/2004 | Lucas et al. |
| 6,854,120 B1 | 2/2005 | Lo et al. |
| 7,421,646 B1 | 9/2008 | Leung |
| 7,774,301 B2 | 8/2010 | Johnson et al. |

(Continued)

FOREIGN PATENT DOCUMENTS

EP    1762946 A1    3/2007

OTHER PUBLICATIONS

Gentry et al., "Generic Code Page Conversion Application Program Interface", An IP.com Prior Art Database Technical Disclosure, Original Publication Date: May 1, 1992, Original Disclosure Information: TDB n12 05-92 p. 421-430, IP.com No. IPCOM000108377D, IP.com Electronic Publication Date: Mar. 22, 2005, 11 pages.

(Continued)

*Primary Examiner* — Tarek Chbouki
(74) *Attorney, Agent, or Firm* — Daniel R. Simek

(57) ABSTRACT

A computer-implemented method includes receiving, from a first network application, a first unbounded list of objects of a first type and a second unbounded list of objects of a second type, wherein the second type is distinct from the first type, and producing a third unbounded list of objects of a third type, wherein the third type is distinct from both the first type and the second type. The computer-implemented method further includes providing the third unbounded list to a second network application. A corresponding computer program product and computer system are also disclosed.

1 Claim, 3 Drawing Sheets

(56) References Cited

U.S. PATENT DOCUMENTS

| | | |
|---|---|---|
| 7,861,250 B2 | 12/2010 | Messec et al. |
| 8,196,033 B2 | 6/2012 | Lo et al. |
| 8,260,826 B2 | 9/2012 | Chen et al. |
| 8,447,744 B2 | 5/2013 | de Castro Alves et al. |
| 8,484,255 B2 | 7/2013 | Amulu et al. |
| 8,954,861 B1 | 2/2015 | Takahashi et al. |
| 9,430,494 B2 | 8/2016 | Park et al. |
| 2003/0126571 A1 | 7/2003 | Srinivasan et al. |
| 2003/0172368 A1 | 9/2003 | Alumbaugh et al. |
| 2005/0197975 A1 | 9/2005 | Benson |
| 2007/0100629 A1* | 5/2007 | Bodin .................. G10L 13/00 704/261 |
| 2008/0201358 A1* | 8/2008 | Calusinski .......... G06F 16/24573 |
| 2008/0243874 A1* | 10/2008 | Suthar .................. G06F 40/14 |
| 2012/0072402 A1 | 3/2012 | Fraboulet Laudy Claire et al. |
| 2014/0032568 A1 | 1/2014 | Leko et al. |
| 2014/0279747 A1 | 9/2014 | Strassner |
| 2014/0282600 A1* | 9/2014 | Siepmann ............. G06F 9/5066 718/106 |
| 2015/0302015 A1 | 10/2015 | Saurel et al. |
| 2017/0142200 A1 | 5/2017 | Kodner et al. |

OTHER PUBLICATIONS

List of IBM Patents or Patent Applications Treated as Related, Appendix P, Filed Herewith, 2 pages.

Connolly, et al., "Unbounded List Processing", U.S. Appl. No. 15/191,903, filed Jun. 24, 2016.

Connolly, et al., "Unbounded List Processing", U.S. Appl. No. 15/727,788, filed Oct. 9, 2017 (now U.S. Pat. No. 10,127,330).

Connolly, et al., "Unbounded List Processing", U.S. Appl. No. 16/384,431, filed Apr. 15, 2019.

Sottile et al., Workflow representation and runtime based on lazy functional streams, WORKS 09, Nov. 15, 2009, Portland Oregon, USA, pp. 1-10. (Year: 2009).

Aguado et al., Computing with Streamsm, DAMP'11, Jan. 23, 2011, Austin, Texas, USA, pp. 35-44. (Year: 2011).

* cited by examiner

UNBOUNDED LIST PROCESSING

BACKGROUND

The present invention relates generally to the field of mapping lists, and more particularly to mapping inputs to outputs in sequential data stores.

Sequential data stores, such as Extensible Markup Language (XML) and JavaScript Object Notation (JSON), are generally processed by iterating through the stored data into an object model in memory. Example processing tools include transformation tools, such as Extensible Stylesheet Language Transformations (XSLT) or IBM® Transformation Extender (a/k/a IBM® WebSphere TX). In general, data stores of this type can be viewed as unbounded lists, where each new data element is read in in sequence with no foreknowledge by the processor when the data will terminate. A general property of reading data in XML and similar formats is that they are efficiently processed in a single iteration over the (potentially very long) input data. Software engineers continue to face challenges in efficiently processing such sequential data on a single pass.

SUMMARY

A computer-implemented method includes receiving, from a first network application, a first unbounded list of objects of a first type and a second unbounded list of objects of a second type, wherein the second type is distinct from the first type, and producing a third unbounded list of objects of a third type, wherein the third type is distinct from both the first type and the second type. The computer-implemented method further includes providing the third unbounded list to a second network application. A corresponding computer program product and computer system are also disclosed.

DETAILED DESCRIPTION

Referring now to the invention in more detail, the invention is directed to a mapping engine and associated tools to for splitting an unbounded output list into two or more unbounded output lists to facilitate mapping multiple source types to a common target type. Mapping tools such as IBM® Transformation Extender (WebSphere TX) and XSLT editors make it easy to map data from input formats to output formats. Such tools may have multiple inputs. Inputs can include, for example, a list of cats and a list of birds, which might be mapped to a list of animals. In such an example, each input and output may have associated therewith a list of attributes: each cat may have a name, a weight, hair/no hair, and number of legs. Similarly, each bird have a weight, number of legs, size of beak, etc. The combined type, animals, may have a number of legs and a weight. The inventors have observed and/or recognized that each type requires a separate rule to map to the same output. In the cats/birds example, if cats and birds are mapped to animals, then the mapping rule must take account of the different attributes that each type has. The inventors have further observed and/or recognized that existing mapping tools for XML and other sequential data do not permit disparate lists with different mapping rules to the a common output.

For example, the inventors have observed and/or recognized that, in IBM® Transformation Extender (Websphere TX) and similar tools, it is possible to map a repeating list of input objects into a repeating list of output objects. The inventors have further observed and/or recognized that, for each input type, a subroutine is called to iterate over the list of input objects and perform field-level mapping for each input object to an output object, which makes it possible to iterate over one type (e.g., cats or birds) but not both. The inventors have further observed and/or recognized that an existing solution is to create additional instances of the output object, but this requires specifying in advance how many outputs (i.e., how many source types) are needed. The inventors have further observed and/or recognized that existing solutions lack the ability to determine cardinality at runtime. The inventors have further observed and/or recognized that, if the input is an unbounded list, it will not be possible to specify the number of input types, and the described approach does not work. It will be understood, however, that foregoing discussion of various problems with the prior art are not intended to limit any particular embodiment as necessarily solving any particular problem described herein.

Figure 1:
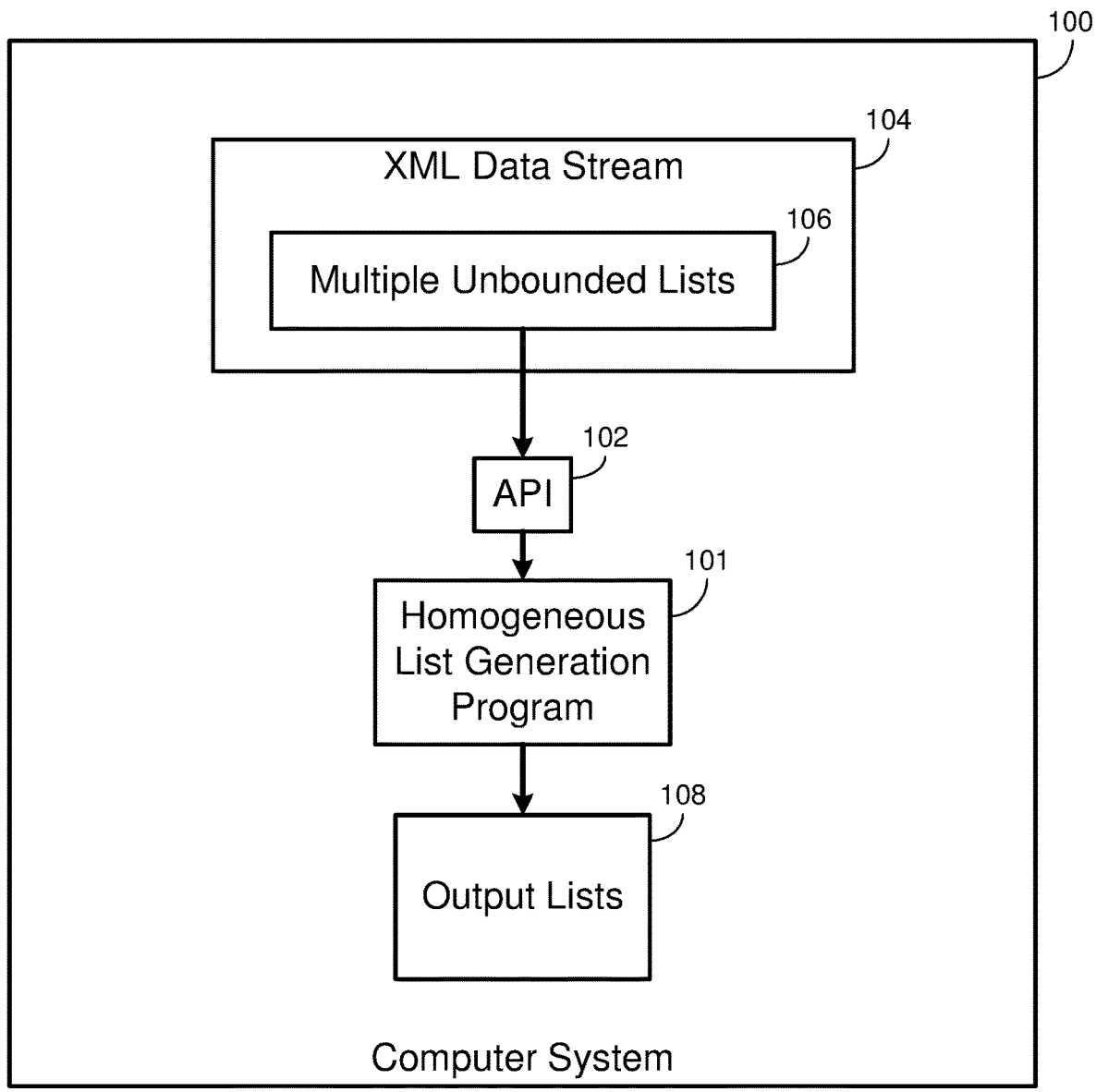
FIG. 1 is a block diagram of a computing environment suitable for operation of a homogeneous list generation program, in accordance with at least one embodiment of the invention.

Referring now to the embodiment depicted in FIG. 1, FIG. 1 is a block diagram of an exemplary computing environment suitable for operating a homogeneous list generation program 101, in accordance with at least one embodiment of the present invention. A computer system 100 includes a general purpose computer such as the general purpose computer system depicted in FIG. 3. More generally, the computer system 100 may be any Turing complete physical or virtual computer.

Referring still to the embodiment depicted in FIG. 1, the computer system 100 receives, processes, identifies, or otherwise interacts with XML data stream 104. In alternative embodiments, the XML data stream 104 may be a JSON data stream or other sequential data source. The XML data stream 104 may be read from a local or remote text file or read in as a stream over HTTP, for example via the XMLHttpRequest JavaScript object. Accordingly, the computer system 100 may access the XML data stream 104 via the Internet programming technique known as Asynchronous Javascript and XML (AJAX), or, for JSON streams, Asynchronous JavaScript and JSON (AJAJ).

It should be understood that XML, JSON, and other sequential data formats are, fundamentally, technologies that enable information exchange between applications over large computer networks such as the Internet or private Internet protocol-based networks or other networks operated by organizations. Software tools that manipulate XML and other sequential formats therefore are ordinarily processing data for either transmission or receipt between network applications. In one example, a user-facing web application accesses data from a database via an XMLhttpRequest Javascript object, making the web application and the database both network applications, as used herein. More generally, software programs and modules that exchange data over a network may be understood to be network applications. With the current prevalence of network applications of all kinds, the functions of XSLT and other programs that process data in network exchange formats are fundamental technologies for the operation of the Internet ecosystem.

Referring still to the embodiment of FIG. 1, the XML data stream 104 includes multiple unbounded lists 106. For example, a given XML stream may define tags <cat> and <bird>, with subtags listing the elements of each. The XML data stream 104 can include any number of <cat> tags and any number of <bird> tags. Because the XML data is received or read sequentially, the list of <cat> tags and the list of <bird> tags are both unbounded: it is not possible to know the number of tags in the data set until the entire data set is received or read.

Referring still to the embodiment depicted in FIG. 1, the XML data stream 104 may be passed to an Application Programming Interface (API) 102. The API 102 take the form of an XML handler, server/daemon process, script library, or other function, process or hook that interacts with the XML data stream 104. The API 102 may be provided, instantiated, created by, together with, or for a homogeneous list generation program 101 such that the API 102 passes data to the homogeneous list generation program 101, which generates one or more output lists 108, according to the method(s) disclosed herein.

Referring still to the embodiment of FIG. 1, the output lists 108 may be expressed in XML, JSON, or other sequential data format. Alternatively, the output lists 108 may be represented in memory for one or more application-level programs running on the computer system 100 or another computer system, for example as a linked list, array, tree, data object, or other structure. The output lists 108 may be stored locally on the computer system 100 or transmitted via a network or written to a removable medium such as an optical data disc or thumb drive.

Figure 2:
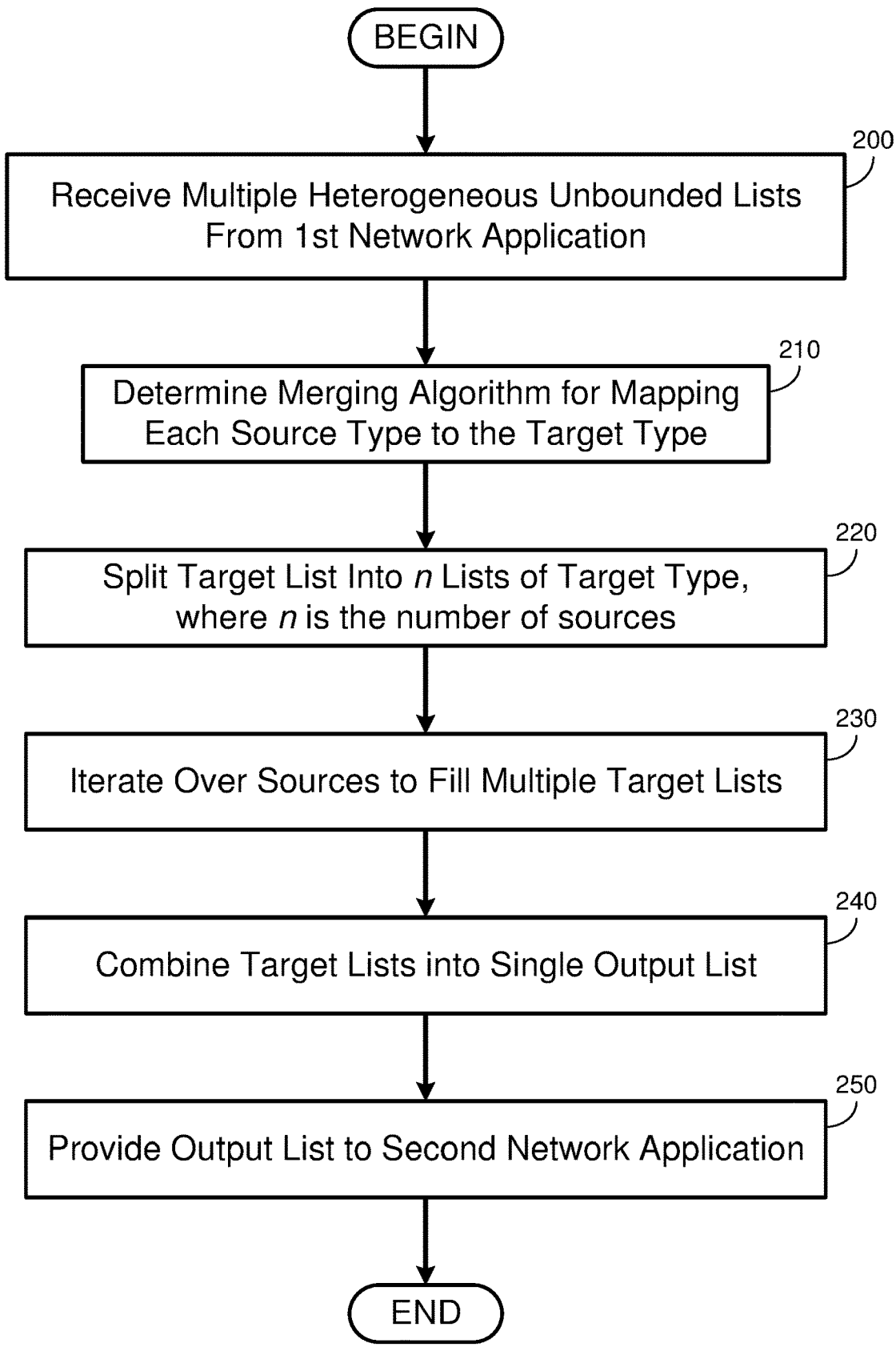
FIG. 2 is a flowchart diagram for a homogeneous list generation program, in accordance with at least one embodiment of the invention.

FIG. 2 is a flowchart diagram for the homogeneous list generation program 101, in accordance with at least one embodiment of the present invention. At step 200, the homogeneous list generation program 101 receives, from a first network application, multiple heterogeneous unbounded lists, such as the multiple unbounded lists 106. In the depicted embodiment, the first network application is sending data to a second network application. For example, a database may be sending target data to a recipient web application via an XMLHttpRequest call. More particularly, the homogeneous list generation program 101 receives at least a first unbounded list of objects of a first type (e.g., an arbitrary XML stream including <cat> tags, such that the <cat> tags form the first unbounded list, and <cat> is the first type) and a second unbounded list of objects of a second type (e.g., the same arbitrary XML stream includes an unbounded number of <bird> tags, such that the <bird> tags form the second unbounded list, and <bird> is the second type). In the <cat> and <bird> example, the first type is distinct from the second type (objects of type <cat> are not objects of type <bird> and vice versa). In an embodiment, the first unbounded list and second unbounded list are provided as inputs to the API 102. It should be noted that the unbounded input lists are referred to herein as separate entities, however in various embodiments, such lists can exists comingled in a single XML as well as being sourced separately, for example from distinct XML streams.

Referring still to the embodiment depicted in FIG. 2, at step 210, the homogeneous list generation program 101 determines a merging algorithm for mapping each source type to a target type, based on the first type and the second type. For example, a merging algorithm may be to map the <cat> type and <bird> type to type <animal>. Such a merging algorithm can take account of various properties that each type. For example, if a <beak_shape> attribute exists for the <bird> type, but not the <cat> type, then the merging algorithm may specify how the beak type should be represented when mapping to type <animal>, where <animal> objects may represent an animal that does not have a beak, such as a cat. If <beak_shape> is not important for the <animal> tag application, then the merging algorithm can simply drop the <beak_shape> tag data. Alternatively, the merging algorithm can preserve the <beak_shape> data in <animal> but set to value "none" or "undefined" when mapping from <cat>. In another example, if <cat> has defined <litter_size> and <bird> has <number_of_eggs>, then the merging algorithm can define <number_of_offspring>, generalizing from the attributes of <cat> and <bird>.

Such a merging algorithm may be specified by a human programmer or user. Alternatively, a database of merging algorithms may be provided and the homogeneous list generation program 101 may select a matching rule from the database. In another embodiment, a machine learning engine and/or an analytics engine may have learned and/or defined a topic hierarchy that the homogeneous list generation program 101 can apply to generate a merging algorithm.

Alternatively to determining a merging algorithm, at step 210, the homogeneous list generation program 101 may receive one or more rules (e.g. <cat>-><animal>, <bird>-><animal>) and apply the one or more rules to the first unbounded list and the second unbound list, for example by arranging the rules in a preference order and searching for applicable rules for each element of the XML. This model may be compared to a rule-based mail filter or a program expressed in a PROLOG style language.

In still another embodiment, at step 210, the homogeneous list generation program may combine the first unbounded list with the second unbounded list with a merging function. A merging function may be expressed as a program function (i.e., in C) and/or class function/method (i.e., in C++/Java) whose arguments are the first and second unbounded lists and whose output is the desired mapping.

Referring still to the embodiment of FIG. 2, at step 220, the homogeneous list generation program 101 splits a target list (i.e., an empty, unbounded list of the target type, such as <animal> in the <cat> and <bird> example) into n lists of the target type, where n is the number of sources. In the <cat> and <bird> example, n=2, however any number of source lists may be combined by splitting the target list into more parts, one for each source. Also, any n>2 can be achieved by sequentially processing n=2 with each output list, until all targets are exhausted.

In the n=2 case, the target type is a third type, wherein the third type is distinct from both the first type and the second type. As used here, "distinct" means having different and exclusive labels. For example <cat> and <bird> are distinct because no <cat> is a <bird> and vice versa. For <animal>, there is a hierarchical relationship such that <cat> and <bird> map to <animal>, and, in plain language, a cat is an animal and a bird is an animal. However, in various representations according to embodiments of the invention, an <animal> is not a <cat> or a <bird>, and vice versa, despite the hierarchical relationship. While distinct from the first type and the second type, the third type may be understood, in at least some embodiments, as generic to the first type and the second type, as <animal> is <bird> and <cat>. In general, the third type is the type of the output lists 108. Similarly, the third type may be the output of the API 102, or the type of an unbounded list returned via the API 102.

Similarly, applying rules at step 220 or applying a merging function at step 220 may yield the third unbounded list.

Referring still to the embodiment depicted in FIG. 2, at step 230, the homogeneous list generation program 101 iterates over the various source lists to fill the multiple (n) target lists. More specifically, producing the third unbounded list may include the homogeneous list generation program 101 splitting the third unbounded list (still empty, so the split is logical) into a first intermediate unbounded list and second intermediate unbounded list, The homogeneous list generation program 101 may associate the first unbounded list with the first intermediate unbounded list (i.e., by mapping the source, first unbounded list, to its exclusive target, the first intermediate unbounded list). Similarly, the homogeneous list generation program 101 may associate the second unbounded list with the second intermediate unbounded list. The homogeneous list generation program 101 may associate the first intermediate unbounded list and the second intermediate unbounded list with the third type (i.e., by internally designating each intermediate list as of type animal for receiving mapped objects of type <bird> and type <cat>). The homogeneous list generation program 101 may iterate over the first unbounded list, transforming each element thereof into the first intermediate unbounded list. Similarly, the homogeneous list generation program 101 may iterate over the second unbounded list, transforming each element thereof into the second intermediate unbounded list.

At step 240, the homogeneous list generation program 101 may combine the first intermediate unbounded list with the second intermediate unbounded list to yield the third unbounded list, or an output list 108. In some embodiments, the representation of the third unbounded list may remain an internal data structure, such as a linked list, array, etc. In some embodiments, the third unbounded list may be represented sequentially as new, combined XML, JSON, etc.

At step 250, the homogeneous list generation program 101 provides the third unbounded list to a second network application. In an example where the second network application is a web application running on a web server, the homogeneous list generation program 101 may take the form of a web server module which preprocesses the data for the web application. Providing may take the form of placing the list data in a file on a filesystem or streaming the data sequentially into a handler instantiated by the web application for receiving data.

Figure 3:
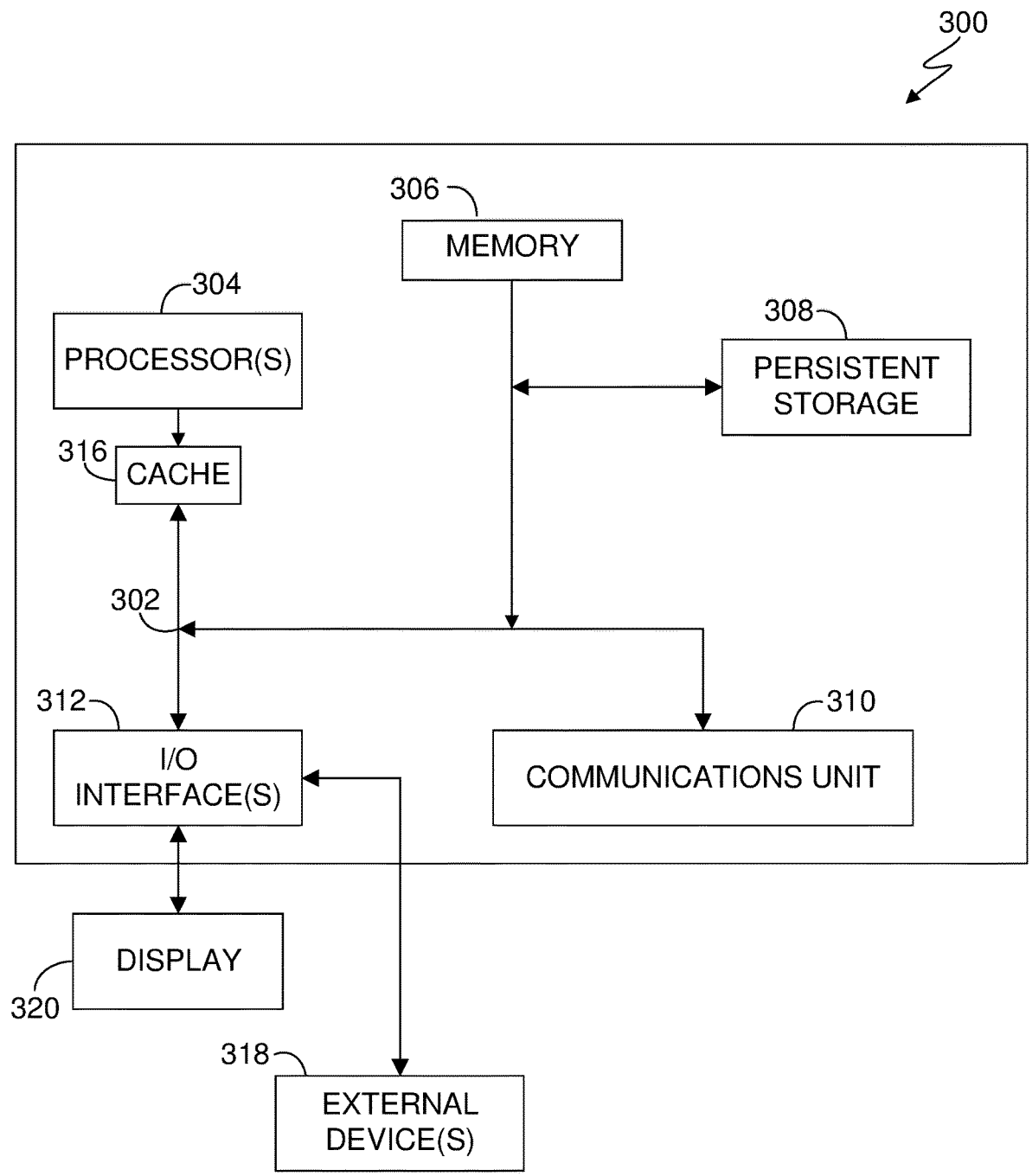
FIG. 3 is a block diagram depicting various logical elements for a computer system capable of executing program instructions, in accordance with at least one embodiment of the present invention.

FIG. 3 is a block diagram depicting components of a computer 300 suitable for executing the homogeneous list generation program 101. FIG. 3 displays the computer 300, the one or more processor(s) 304 (including one or more computer processors), the communications fabric 302, the memory 306, the RAM, the cache 316, the persistent storage 308, the communications unit 310, the I/O interfaces 312, the display 320, and the external devices 318. It should be appreciated that FIG. 3 provides only an illustration of one embodiment and does not imply any limitations with regard to the environments in which different embodiments may be implemented. Many modifications to the depicted environment may be made.

As depicted, the computer 300 operates over a communications fabric 302, which provides communications between the cache 316, the computer processor(s) 304, the memory 306, the persistent storage 308, the communications unit 310, and the input/output (I/O) interface(s) 312. The communications fabric 302 may be implemented with any architecture suitable for passing data and/or control information between the processors 304 (e.g. microprocessors, communications processors, and network processors, etc.), the memory 306, the external devices 318, and any other hardware components within a system. For example, the communications fabric 302 may be implemented with one or more buses or a crossbar switch.

The memory 306 and persistent storage 308 are computer readable storage media. In the depicted embodiment, the memory 306 includes a random access memory (RAM). In general, the memory 306 may include any suitable volatile or non-volatile implementations of one or more computer readable storage media. The cache 316 is a fast memory that enhances the performance of computer processor(s) 304 by holding recently accessed data, and data near accessed data, from memory 306.

Program instructions for the homogeneous list generation program 101 may be stored in the persistent storage 308 or in memory 306, or more generally, any computer readable storage media, for execution by one or more of the respective computer processors 304 via the cache 316. The persistent storage 308 may include a magnetic hard disk drive. Alternatively, or in addition to a magnetic hard disk drive, the persistent storage 308 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of the persistent storage 308.

The communications unit 310, in these examples, provides for communications with other data processing systems or devices. In these examples, the communications unit 310 may include one or more network interface cards. The communications unit 310 may provide communications through the use of either or both physical and wireless communications links. Homogeneous list generation program 101 may be downloaded to the persistent storage 308 through the communications unit 310. In the context of some embodiments of the present invention, the source of the various input data may be physically remote to the computer 300 such that the input data may be received and the output similarly transmitted via the communications unit 310.

The I/O interface(s) 312 allows for input and output of data with other devices that may operate in conjunction with the computer 300. For example, the I/O interface 312 may provide a connection to the external devices 318, which may include a keyboard, keypad, a touch screen, and/or some other suitable input devices. External devices 318 may also include portable computer readable storage media, for example, thumb drives, portable optical or magnetic disks, and memory cards. Software and data used to practice embodiments of the present invention may be stored on such portable computer readable storage media and may be loaded onto the persistent storage 308 via the I/O interface(s) 312. The I/O interface(s) 312 may similarly connect to a display 320. The display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product comprising:

one or more non-transitory computer readable storage media and program instructions stored on the one or more computer readable storage media, the program instructions comprising:

program instructions to receive from a first network application, a first unbounded list of objects of a first type and a second unbounded list of objects of a second type, wherein said second type is distinct from said first type;

program instructions to determine a merging algorithm based on said first type and said second type;

program instructions to receive one or more rules;

program instructions to receive a merging function, said merging function including a program function including arguments comprising the first unbounded list of objects of the first type and the second unbounded list of objects of the second type;

program instructions to produce a third unbounded list of objects of a third type, wherein said third type is distinct from both said first type and said second type, said third unbounded list is populated through a process including program instructions, to:

apply said one or more rules to said first unbounded list and said second unbounded list;

apply said merging function to said first unbounded list and said second unbounded list;

split said third unbounded list into a first intermediate unbounded list and a second intermediate unbounded list;

associate said first unbounded list with said first intermediate unbounded list;

associate said second unbounded list with said second intermediate unbounded list;

associate said first intermediate unbounded list and said second intermediate unbounded list with said third type;

iterate over said first unbounded list, transforming each element thereof into an element of said first intermediate unbounded list; and iterate over said second unbounded list, transforming each element thereof into an element of said second intermediate unbounded list; and combine said first intermediate unbounded list with said second intermediate unbounded list to yield a populated instance of said third unbounded list;

program instructions to provide said third unbounded list to a second network application by streaming data of said third unbounded list sequentially into a handler instantiated by the second network application; and program instructions to provide an application programming interface, wherein said first unbounded list and said second unbounded list are inputs to said application programming interface, and wherein said third type is an output of said application programming interface.

* * * * *